United States Patent [19]

Noack

[11] 4,355,271

[45] Oct. 19, 1982

[54] CONTROL APPARATUS

[76] Inventor: Raymond J. Noack, 10 Nicholls Pl., Higgins, Australian Capital Territory, Australia

[21] Appl. No.: 112,510

[22] Filed: Jan. 16, 1980

Related U.S. Application Data

[63] Continuation-in-part of Ser. No. 78,624, Sep. 25, 1979, abandoned.

[30] Foreign Application Priority Data

Sep. 25, 1978 [AU] Australia .............................. PD6090
Oct. 3, 1978 [AU] Australia .............................. PD6177

[51] Int. Cl.$^3$ .......................... G05B 5/00; A47L 1/00
[52] U.S. Cl. ................................... 318/480; 318/483; 318/DIG. 2; 315/77; 315/82; 15/250.17
[58] Field of Search ............... 318/DIG. 2, 483, 480, 318/443; 324/58.5 B; 315/77, 82, 159; 307/10 R; 15/250 C, 250.17

[56] References Cited

U.S. PATENT DOCUMENTS 3,786,330  1/1974  Inoue et al. ........................ 318/483
3,826,979  7/1974  Steinmann ......................... 318/483
3,925,244 12/1975  Nagasawa et al. .................. 315/77
4,010,383  3/1977  Grassmann ......................... 318/483
4,131,834 12/1978  Blaszkowski ....................... 318/483
4,139,801  2/1979  Linares ............................. 315/82

Primary Examiner—Ulysses Weldon
Attorney, Agent, or Firm—Sughrue, Mion, Zinn, Macpeak & Seas

[57] ABSTRACT

Control apparatus for controlling windscreen wiper apparatus of a vehicle. An infra-red radiating device directs infra-red radiation from the interior of the vehicle through the windscreen to be reflected from the outer surface of the windscreen back into the vehicle where it is detected by a detector. The apparatus is responsive to variations in infra-red radiation incident on the detector to control the wiper apparatus to set the vehicle wipers in operation when dust or water is detected on the windscreen. Also, the windscreen washer apparatus is automatically operated when dust is detected. The control apparatus also operates in response to detection of a decrease in the ambient light level to operate the vehicle lights.

28 Claims, 6 Drawing Figures

CONTROL APPARATUS

RELATED APPLICATION IDENTIFICATION

This is a continuation-in-part of patent application Ser. No. 78,624, filed Sept. 25, 1979, now abandoned.

This invention relates to control apparatus for controlling windscreen wiper apparatus of a vehicle and to a method of detecting presence of rain on a vehicle windscreen.

Power operated wipers of vehicles are customarily controlled manually by the vehicle driver. Although it is customary to provide windscreen wiper control apparatus in modern vehicles enabling the driver to regulate the speed of operation of the windscreen wipers to accommodate differing weather conditions, the operation of the windscreen wiper control apparatus is still somewhat tedious particularly under conditions where rainfall on the windscreen is varying. Aside from this, the constant readjustment by turning on or off or adjustment of speed of windscreen wipers under such conditions causes undesirable loss of concentration on the part of the driver.

An object of the invention is to provide an apparatus which is capable of controlling a windscreen wiper apparatus of a vehicle such as to automatically turn the wiper apparatus on and off without intervention of the driver.

According to the invention there is provided control apparatus for controlling windscreen wiper apparatus of a vehicle, said control apparatus comprising:

(a) emitter means operable to generate energy and direct the generated energy away therefrom;

(b) sensor means for sensing energy directed thereto from said emitter means;

(c) means for supporting said emitter means and sensor means for mounting these against the interior surface of a vehicle windscreen, so that when energy is directed away from said emitter means, portion of said energy may be reflected back to said sensor means in such a manner as to cause the sensor means to in use alter its electrical condition in accordance with variation in the physical conditions prevailing at an outer surface of the windscreen opposite said interior surface, the control means being connectible to said windscreen wiper apparatus of the vehicle and operating in use to generate an electric signal pursuant to alteration of said electrical condition of said sensor means to control operation of said windscreen wiper apparatus in a manner such as to operate vehicle windscreen wipers to clear the windscreen in accordance with detection of said variations in physical conditions at the outer surface of the windscreen where such variations are indicative of a need for such clearing.

The invention further provides a method of detecting the presence of dust or water on a vehicle windscreen comprising directing energy through the inner surface of the windscreen to be reflected at the outer surface of the windscreen and to pass back through the windscreen and through the inner surface of the windscreen to the interior of the vehicle, and detecting variations in intensity of such reflected energy due to presence of dust or rain on the windscreen.

The invention is described further by way of example only with reference to the accompanying drawings in which.

GENERAL DESCRIPTION

Figure 1:
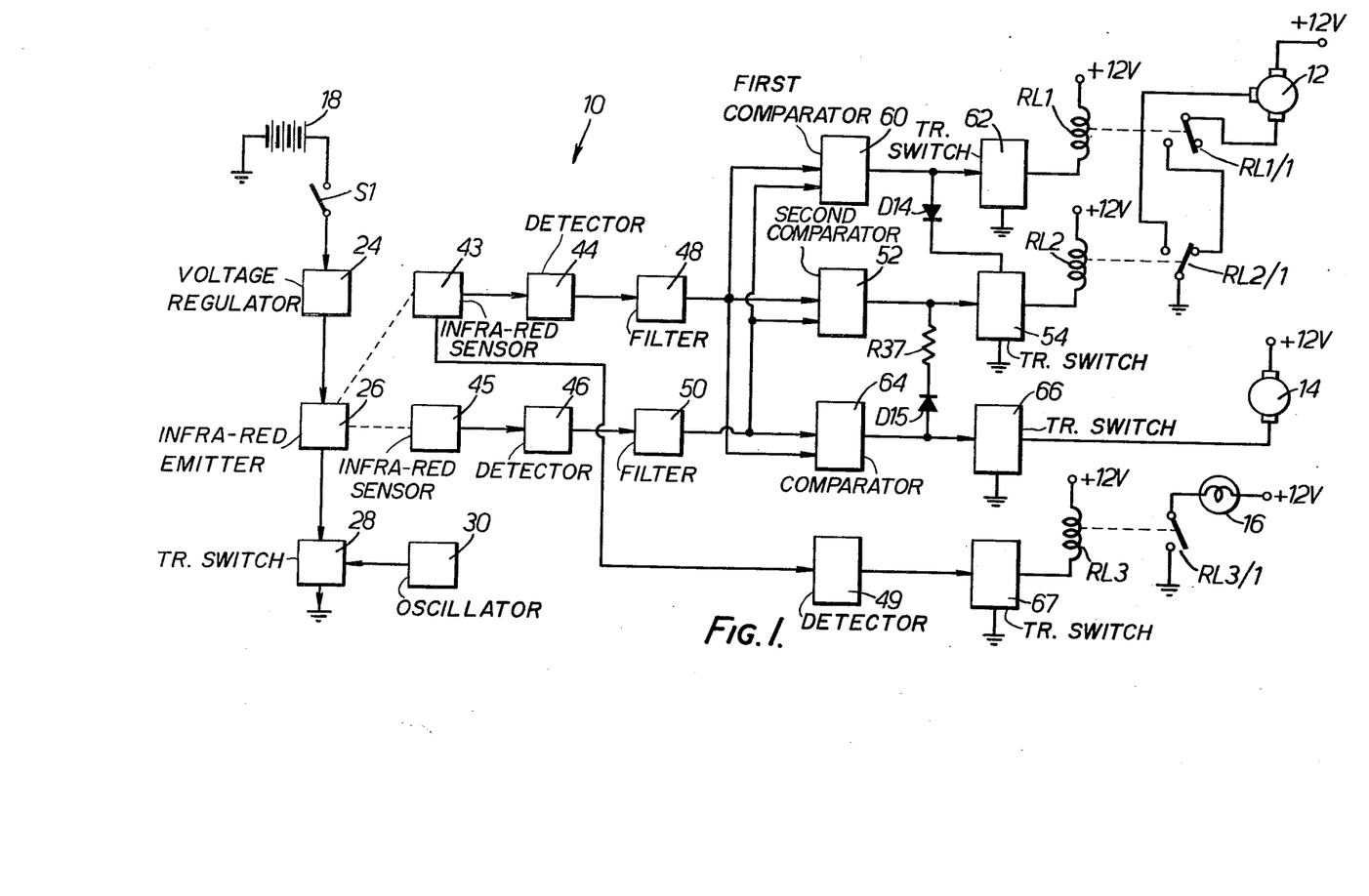
FIG. 1 is a block diagram of an apparatus constructed in accordance with the invention.

A control apparatus 10 is shown schematically in FIG. 1. It is designed to be fitted to a vehicle so as to control operation of a motor 12 which operates the windscreen wiper apparatus of the vehicle for clearing the windscreen when water or dust is detected on the outer surface of the windscreen. Further, the apparatus 10 is arranged to control operation of a washer pump 14 which is arranged to direct water onto the windscreen during clearing of dust from the windscreen. Further, the apparatus 10 is designed to control the exterior lights 16 of the vehicle, such as the headlights and taillights, so as to turn these on under conditions where the ambient light level exterior to the vehicle drops below a first predetermined level and to turn them off when the ambient light level rises to a second predetermined light level.

The apparatus 10 is designed for operation from a vehicle battery 18 having its negative terminal connected to ground and its positive terminal connected via a main control switch S1 to a voltage regulator 24. Regulator 24 is connected to an infra-red emitter device 26 and thence through a transistor switch 28 to ground. An oscillator 30 is provided which generates thirty-microsecond pulses at about three millisecond intervals and applies these to the switch 28 so as to turn the switch on to cause corresponding current pulses of the order of 1 ampere to flow from the voltage regulator through the emitter device 26 and switch 28 to ground. By this means the emitter device is caused to generate infra-red radiation.

Figure 5:
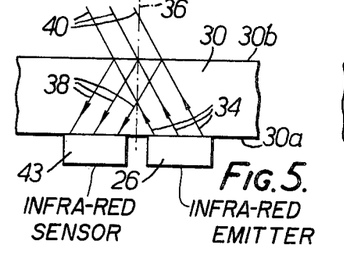
FIGS. 5 and 6 are fragmentary cross-sections of a vehicle windscreen showing paths of infra-red radiation emitted by an infra-red emission means forming part of the apparatus of FIG. 1 under conditions where the outer surface of the windscreen is clear and where water droplets are on the outer surface of the windscreen, respectively.
Figure 6:
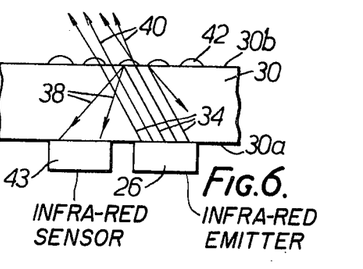

As shown in FIG. 5, and described in more detail later, device 26 is in use positioned against the interior face 30a of the vehicle windscreen 30 so as to direct radiation on paths 34 from the device 26 through the rear face 30a into the windscreen and to the front face 30b. The angle of the paths 34 is arranged to be in the range of 20° to 40° to the normal 36 to the windscreen as indicated. Then, a portion of the rays striking the outer face 30b of the windscreen are reflected back towards the rear face 30a on paths 38 as indicated whilst most of the radiation passes directly through the windscreen to leave the windscreen forwardly thereof on the paths 40 indicated. As best shown in FIG. 6, the presence of water droplets on the outer face 30b, such as the droplets indicated by reference numeral 42, is such as to alter the proportion of radiation passing back on the reflected paths 38. In particular, radiation is lost through scattering and through the random reflections at the outer face 30b.

The apparatus 10 further includes an infra-red sensor 43 which, as shown in FIG. 5, is positioned against the rear face 30a of windscreen 30 so as to normally receive the reflected rays on path 38 from emitter device 26. However, as illustrated in FIG. 6, under the condition where water droplets are present on outer face 30b, the amount of radiation reaching the sensor 43 is lessened.

Although not shown, there is a further condition under which the amount of radiation reaching the sensor 43 from emitter device 26 will vary from the usual condition. That is when there is a layer of dust or the like on the outer face 30b of the windscreen. In this case, there will be a greater amount of reflection along paths 38 and less radiation will escape along paths 40. In this case, then, sensor 43 receives increased radiation from emitter device 26.

The emitter device 26 and sensor 43 are mounted by a specific structure on the windscreen, such structure being illustrated in FIGS. 2 and 3 and described in detail later. It will, however, for the moment, be noted that in addition to the sensor 43 carried by such structure, there is also a further sensor 45 which is so shielded as not to receive reflected radiation at all, but to receive direct radiation from device 26. Sensor 45 acts as a reference sensor also in a manner as described later.

Reverting to FIG. 1, the sensor 43 is connected to a detector 44 such that the output from the detector comprises a pulsed voltage, the amplitude of pulses thereof being substantially directly proportional to the amount of radiation received by the sensor 43 so that under the condition where water droplets 42 are present there will be a decrease in pulse signal amplitude from the detector 44 and under the condition when there is dust on the windscreen, there will be an increase in signal amplitude. The pulse signals from detector 44 are applied to a smoothing filter 48 to produce a dc voltage the magnitude of which is proportional to the amount of reflected radiation striking the sensor 43.

Sensor 45 is also connected to a detector 46 which generates pulsed signals of amplitude which is constant for a given temperature. However, since the light output from the emitter 26 is inversely proportional to temperature, the amplitude of pulses from both the detectors 46 and 44 will vary with temperature. The pulses from detector 46 are filtered in a filter 50 to generate a dc reference voltage which varies only in accordance with temperature. The outputs from filters 48, 50 are applied to a first comparator 60. Under the normal condition where the outer surface 30b of windscreen 30 is dry and clean, the output from filter 48 is just above the reference voltage comprising the output from filter 50. Under the condition where light rain has fallen on the windscreen 30, output from filter 48 will fall and, when this fall reaches a first magnitude, the comparator 60 will operate to generate a signal which is applied to a transistor switch 62 which controls current supply to a relay RL1 so that the contacts RL1/1 of relay RL1 are operated to operate the motor 12 at a slow rate. A second comparator 52 also receives outputs from the two filters 48, 50 and, when the fall in output from filter 48 exceeds a second magnitude greater than the first magnitude required to operate comparator 60, a further transistor switch 54 is operated to operate a further relay RL2 the contacts RL2/1 of which are then operated to operate motor 12 at a fast speed.

A further comparator 64 receives the outputs from filters 48 and 50. This is arranged to receive the outputs in relatively reversed relationship compared to comparators 52, 60 so that the output signal therefrom is generated when output from filter 48 exceeds that from filter 50, to then operate a further transistor switch 66 which controls operation of a washer pump 14. Thus, when dust is on the outer surface of the windscreen, output from filter 48 rises and comparator 64 is operated to cause washer pump 14 to operate and apply water to the outer surface of the windscreen. When this occurs, the switch 54 is also operated by signal applied from the comparator 64 via a diode D15 and resistor R37 to operate the windscreen wipers at a fast rate.

A further detector 49 is also coupled to sensor 43. This is arranged to be insensitive to the pulsating signal generated by sensor 43 pursuant to reception by the sensor of infra-red radiation pulses from the emitter device 26. However, it will be appreciated that sensor 43, in addition to receiving pulses of infra-red radiation from emitter device 26, also receives ambient infra-red radiation, and detector 49 is arranged to detect variations in the condition of sensor 43 brought about by such variations in ambient light.

Detector 49 is arranged to operate a transistor switch 67 when the condition of sensor 43 is indicative of a low ambient light level. Switch 67 is arranged to control current supplied to a relay RL3 having relay contacts RL3/1 which control the vehicle lights 16.

Figure 2:
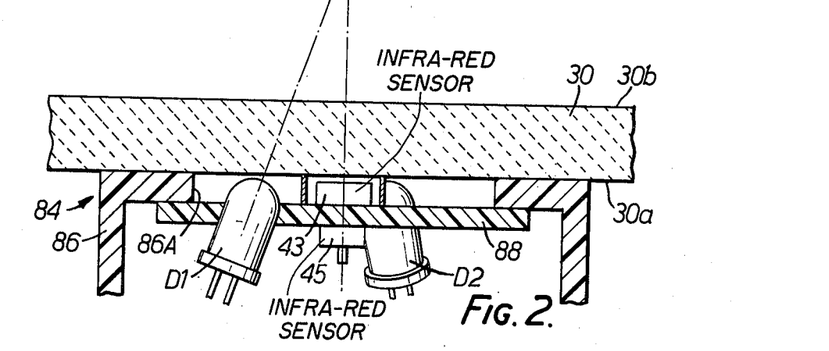
FIG. 2 is a fragmentary cross-section of a windscreen mounting unit forming part of the apparatus of FIG. 1.
Figure 3:
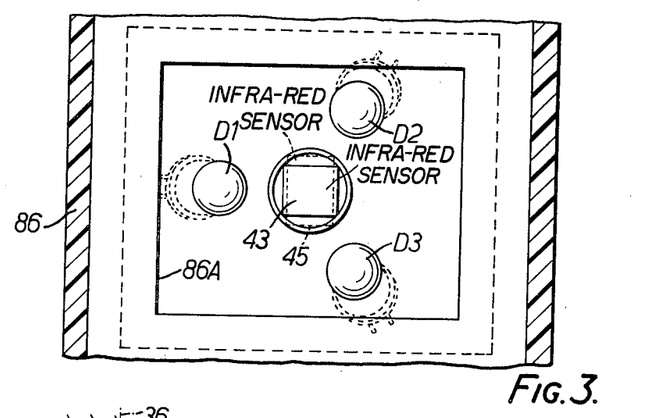
FIG. 3 is a plan view of the mounting unit of FIG. 2.

The physical arrangement of the emitter device 26 and sensors 43, 45 is now described, with particular reference to FIGS. 2 and 3. First, emitter device 26 is shown including 3 infra-red emitter devices D1, D2, D3. The devices D1, D2, D3 are mounted on a mounting assembly 84 connectible to the windscreen 30 of the device. Assembly 84 includes a plastics box 86 having a front aperture 86A which is covered by a plate 88 carrying the three devices D1, D2, D3 such that emission areas on the surfaces of these are, when the box is positioned against a windscreen 30, positioned immediately behind the rear surface 30a of the windscreen for direction of infra-red radiation from the three devices to the sensor 43. Thus, the three devices D1, D2, D3 are arrayed at equi-spaced angles about a central location at which location sensor 43 is positioned to stop thus, sensor 43 is positioned in a cylindrical shield located on the front surface of the plate 88 so as to limit incident light reaching the sensor, but such that the sensor can receive reflected infra-red radiation from the three devices D1, D2, D3. The three devices D1, D2, D3 are arranged for directing the radiation therefrom at the previously mentioned angle of somewhere between 20° and 40° to the normal to the glass windscreen 30. This presupposes the windscreen glass thickness of about 6 mm and the angle will vary somewhat in dependence upon the glass thickness.

Plate 88 also mounts the sensor 45, which is positioned behind plate 88 so as in use to receive direct radiation from the devices D1, D2, D3. In this respect, the box 86, together with the plate 88, form a substantially light tight enclosure around the sensor 45 so that it does not receive reflected radiation.

Figure 4:
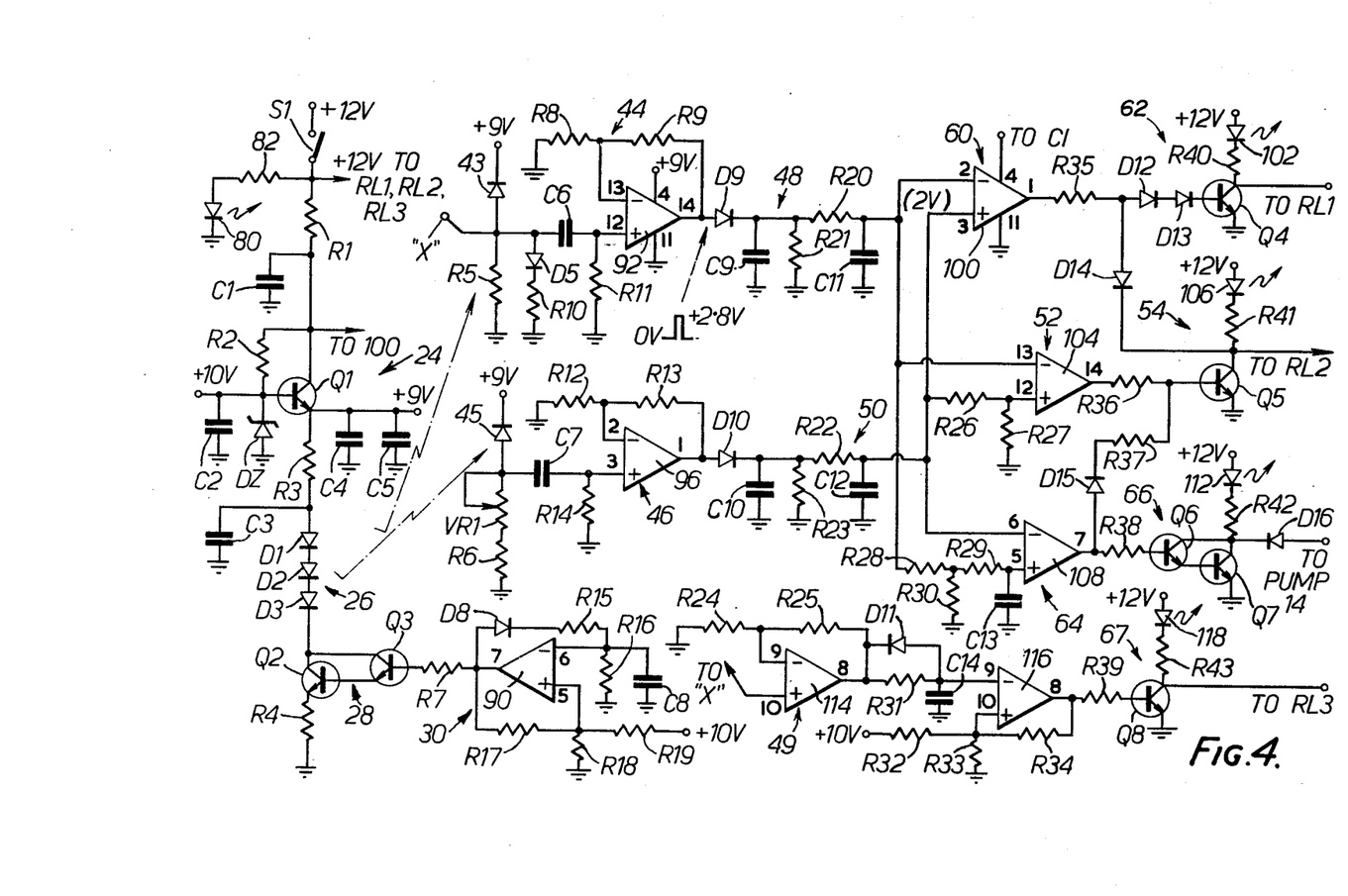
FIG. 4 is a circuit diagram of the apparatus of FIG. 1.

The electrical circuit of the apparatus 10 is now described in detail, with particular reference to FIG. 4.

REGULATOR 24

Regulator 24 includes a transistor Q1 having its collector connected via resistor R1 to switch S1 and its emitter connected via resistor R3 to the three devices D1, D2, D3 which comprise emitter device 26 and which are connected in series as shown.

A Zener diode $D_Z$ is connected to the base of transistor Q1 and a resistor R2 is connected between the collector and the base of transistor Q1 so that, when switch S1 is closed, the base of the transistor is held at a voltage of 10 volts as provided by the Zener diode $D_Z$. A 10-volt regulated supply for other parts of the electric circuit is taken from the base of transistor Q1, a smoothing capacitor C2 being connected thereto. A 9-volt regulated supply for other parts of the circuit is taken from the emitter of transistor Q1, two capacitors C4, C5 being connected to this point for smoothing purposes.

A 12-volt supply for other parts of the circuit is taken from the junction between resistor R1 and the collector of transistor Q1 so that the resistor R1 and capacitor C1 form a filter to filter out noise in the supply path from battery 18.

A 12-volt supply to operate relays RL1, RL2, RL3 is taken directly from the switch S1 at the junction thereof with resistor R1. A light emitting diode 80 is connected via a resistor 82 to the junction to indicate when switch S1 is turned on.

SWITCH 28 AND OSCILLATOR 30

Oscillator 30 in the form of a pulse generator of conventional form including an operational amplifier 90 having its inverting input coupled to ground via a resistor R16 and parallel capacitor C8 and its non-inverting input connected to ground via a resistor R18. The inverting input is also connected to the output of the operational amplifier via a series resistor R15 and diode D8. The non-inverting input also receives the aforementioned 10-volt regulated supply via a resistor R19. The non-inverting input of the amplifier 90 is also connected to the output via resistor R17. Output from the amplifier 90 is connected via resistor R7 to the switch 28 for controlling the switch.

Switch 28 comprises two transistors Q2, Q3 connected to form a controllable current sink. That is to say, the collectors of both transistors are connected to emitter device 26, whilst the emitter of transistor Q2 is connected to ground via a resistor R4. The emitter of transistor Q3 is connected to the base of transistor Q2 and the base of transistor Q3 is connected to the output of resistor R7. Operation of oscillator 30 causes repetitive switching on of transistor Q2 for the aforementioned 3-millisecond periods, switching on occuring on each instance for some 30-microseconds to cause pulsed infra-red radiation to be emitted from the devices D1, D2, D3 making up emitter device 26.

SENSOR 43 AND DETECTOR 44

Sensor 43 comprises a passive device whose resistance varies in dependence with the amount of infra-red radiation incident thereon. Sensor 43 is connected to the 9-volt regulated supply from regulator 24 and also is connected to ground via a resistor R5. The junction between resistor R5 and sensor 43 is connected via a capacitor C6 to the non-inverting input of an operational amplifier 92 forming part of detector device 44. A diode D5 is connected, via a resistor R10, across resistor R5, whilst the non-inverting input to amplifier 92 is connected to ground via a resistor R11. The inverting input of amplifier 92 is connected to ground via a resistor R8 and to the output of amplifier 92 via a resistor R9. In operation, then, amplifier 92 operates to amplify only voltage pulses occurring across resistor R5 pursuant to receipt of light pulses by sensor 43 and produces an output comprising pulses of amplitude proportional to the light pulse strength and independent of the level of ambient light.

The network comprising a series diode D5 and a resistor R10 connected across resistor R5 operates to shunt resistor R5 when the voltage thereacross exceeds a particular level established by the forward breakdown voltage of the diode D5. This shunting slightly lowers the effective resistance between sensor 43 and the ground but to compensate for a slight non-linear increase in pulse amplitude which would otherwise occur at high ambient light level conditions sensed by sensor 43.

It is here noted that the sensor 43 receives both ambient light through windscreen 30 and pulses of light from emitter device 26, the resistance of sensor 43 exhibits a relatively high frequency variation due to receipt of light pulses from the emitter device and a relatively low frequency variation due to ambient light level variation. Thus, the junction between resistor R5 and sensor 43 will exhibit a voltage having a generally dc component established by the ambient light level as well as a pulsating component the amplitude of which is representative of the amount of radiation being received from each pulse of radiation from the emitter device 26. Of these components, the generally dc voltage component is blocked from being passed to amplifier 92 by capacitor C6. The value of capacitor C6 is however chosen to permit the pulsating component to be passed to amplifier 92 as described.

FILTER 48

Filter 48 is connected to the output of the operational amplifier 92 via a diode D9. The filter includes:

a resistor R20 which interconnects the diode D9 and filter output, a capacitor C9 connected between ground and the junction of diode D9 and resistor R20, a resistor R21 connected in parallel to capacitor C9, and a further capacitor C11 connected between an output end of resistor R20 and ground.

Filter 48 simply filters amplified pulses from amplifier 92 and produces a dc output proportional to the pulse amplitude.

SENSOR 45 AND DETECTOR 46

Sensor 45 is connected to the 9-volt regulated supply from regulator 24 and also to ground, via a series network comprising a resistor R6 connected at one end to ground and a variable resistor VR1 connected between sensor 45 and the other end of resistor R6. The junction between sensor 45 and variable resistor VR1 is connected via a capacitor C7 to the non-inverting input of an operational amplifier 96 forming part of detector 46. This input is also connected to ground via a resistor R14. The inverting input of amplifier 96 is connected to ground via a resistor R12 and is also connected to the amplifier output via a resistor R13.

Since sensor 45 receives infra-red radiation substantially only from emitter device 26, its resistance varies in pulsating manner as pulses of light from the emitter device are received. Since the light pulse amplitude varies with temperature as previously described, the amplitude of pulsed variations in resistance of sensor 45 is affected, substantially, only by ambient temperature variations.

Operational amplifier 96 operates to amplify pulsating variations in voltage appearing across variable resistor VR1 and resistor R6 pursuant to variations in resistance of sensor 45. Capacitor C7 blocks any dc signal component appearing at the junction between sensor 45 and the network comprising variable resistor VR1 and resistor R6.

Variable resistor VR1 is adjusted so that the output voltage of amplifier 96, as applied through the filter 50, is set to a predetermined level such as to provide effective temperature compensation for the output of sensor 43, as amplified and filtered by detector 44 and filter 48.

FILTER 50

Filter 50 is similar to filter 48, being connected to the output of operational amplifier 96 via a diode D10. The filter includes:

a resistor R22 in series with diode D10 and the output end of which comprises the output end of the filter, a series capacitor C10 and resistor R23 connected between ground and the junction between diode D10 and resistor R22, and a further capacitor C12 connected between the output end of resistor R22 and ground.

In operation, filter 50 filters the pulsed output from operational amplifier 96 to provided a smoothed dc reference signal at the output end thereof.

COMPARATOR 60

Comparator 60 includes an operational amplifier 100, the inverting input receiving the output from filter 48 and the non-inverting output receiving the output from filter 50. By adjustment of variable resistor VR1, the reference signal as applied to the non-inverting input of amplifier 100 is adjusted to be just below the signal voltage applied to the inverting input under the condition where windscreen 30 is clean and has no water thereon. When water is present on the windscreen the comparator output is switched on as the signal voltage at the inverting input falls, and output is passed, via resistor R35 and two series connected diodes D12, D13, to transistor switch 62.

SWITCH 62

Switch 62 comprises a transistor Q4 having its base connected to the diode D13, its collector connected to 12-volt supply via a light emitting diode 102 and a series resistor R40, and its emitter connected to ground. Output from the collector of this transistor is applied to one end of the coil of relay RL1, the other end of which relay coil is connected to positive supply. Under the condition when comparator 60 is switched on pursuant to detection of water on the windscreen, positive output is applied to the base of transistor Q4 to turn it on. Relay RL1 is thus energized so that the contacts RL1 thereof are shifted from the condition shown at which they provide no current path to motor 12 to one at which they provide connection between a "slow" terminal 12a of motor 12 and one terminal of the contacts RL2/1, being a contact terminal which in the unactuated condition of relay contacts RL2/1, is grounded via contacts RL2/1, thus the switching of contacts RL1/1 caused by operation of switch 62 will, unless contacts RL2/1 are also operated, effect completion of a circuit between the "slow" motor terminal and ground via the two relay contacts RL1/1, RL2/1. A common terminal of motor 12 is connected to positive supply and, on the aforementioned grounding of the slow terminal, the motor operates at slow speed to effect operation of the windscreen wipers at a correspondingly slow rate.

COMPARATOR 52

Comparator 52 comprises an operational amplifier 104 having its inverting input connected to the output from filter 48 and its non-inverting input connected to the output of filter 50 via a resistor R26. The non-inverting amplifier input is also connected to ground via a resistor R27 so that the reference voltage derived from filter 50 has a proportion thereof (determined by the ratio of resistors R26, R27) applied to the non-inverting input amplifier 104. This proportional voltage is arranged to be such that the amplifier 104 will be turned from a condition at which its output is ground (0 volts) to one at which its output is positive at a relatively lower value of output signal from filter 48 than that required to turn on amplifier 100.

SWITCH 54

Switch 54 comprises a transistor Q5 having its collector connected to positive supply via a light emitting diode 106 and a series connected resistor R41. The transistor emitter is connected to ground and the transistor base is connected to the output of amplifier 104 via a resistor R36. The collector of transistor Q5 is connected to one end of the coil of relay RL2, the other end of the relay coil thereof connected to positive supply so that when amplifier 104 turns on transistor Q5 is also turned on to ground the collector thereof and connect the relay coil of relay RL2 across supply to energize this and cause switching of relay contacts RL2/1 from the condition shown in the drawing to a condition at which it disconnects connection to the contacts of relay RL1/1 and connects a "fast" terminal of motor 12 directly to ground. Under this condition, motor 12 thus operates at a faster speed to cause consequent faster operation of the wiper blades.

A diode D14 is connected between the collector of transistor Q5 and the junction of resistor R35 and diode D12 so that when the collector of transistor Q5 is grounded, output from amplifier 100 is inhibited to thereby cause switching off of transistor Q4 and reversion of contacts RL1/1 to the condition shown in FIG. 1.

COMPARATOR 64

Comparator 64 includes an operational amplifier 108 having its inverting input connected to the output from filter 50 and its non-inverting input connected to the output of filter 48 via two series connected resistors R28, R29. The junction between resistors R28 and R29 is connected to ground via a resistor R30 and the junction between resistor R29 and the non-inverting input of amplifier 108 is connected to ground via a capacitor C13. Resistors R28, R30 form a divider network which establishes the sensitivity of comparator 108 whilst resistor R29 and capacitor C13 form a filter network which inhibits switching of comparator 108 when momentary increases in reflected light back to sensor 43 occur, such as when the wiper blades of the wipers of the vehicle are momentarily over the sensor 43.

Amplifier 108 is so arranged that when the signal level on the non-inverting terminal rises to a predetermined level above the reference voltage as applied from filter 50, the output of the amplifier is turned on. This condition is arranged to be reached when a predetermined level of reflected light is received back from diodes D1, D2, D3 at sensor 43 such as is indicative of the presence of dust on the vehicle windscreen.

SWITCH 66

Switch 66 includes two transistors Q6, Q7 having their collectors connected to positive supply via a series connected light emitting diode 112 and a resistor R42. The base of transistor Q6 is connected to the output from amplifier 108 via a resistor R38 whilst the emitter of the transistor Q6 is connected to the base of transistor Q7. The emitter of transistor Q7 is connected to ground. Output at the collector of the transistor Q7 is applied via a diode D16 to one terminal of the washer pump 14, the other terminal of the washer pump being connected to positive supply. Thus, when the amplifier 108 turns on, transistor Q7 is likewise turned on to ground the collector thereof so that current can flow from the positive supply via the pump 14 and diode D16 through transistor Q7 to ground to turn on the washer pump and cause water to be directed onto the windscreen. Since it is not sufficient to merely direct water onto the windscreen to ensure dust removal, provision is made for also turning on the wiper motor under the condition of detection of dust for operating the wipers to assist in the removal of the dust. Thus, the output from amplifier 108 is connected via a series network comprising a diode D15 and a resistor R37 to the base of transistor Q5. In this condition, then, when amplifier 108 turns on, the base of transistor Q5 is rendered positive to cause the transistor to turn on and thus effect operation of the motor 12 at the fast rate. Thus, operation of the windscreen wiper and of the washer motor will continue until dust is no longer detected.

DETECTOR 49

Detector 49 includes a first operational amplifier 114 having its non-inverting input connected to the junction between resistor R5 and sensor 43. The inverting amplifier input is connected to ground via a resistor R24 and to the output of the operational amplifier via a resistor R25. Output from amplifier 114 is connected to the inverting input of the second operational amplifier 116 via a resistor R31 connected in parallel with a diode D11. The inverting input of amplifier 116 is also connected to ground via a capacitor C14. The non-inverting input of amplifier 116 is connected to +10 volts reference supply via a resistor R32 and to ground via a resistor R33. The non-inverting input of amplifier 116 is also connected to the output of amplifier 116 via a resistor R34. Amplifier 114 constitutes a direct current amplifier which amplifies a signal voltage from sensor 43 representative of the ambient light level sensed by sensor 43. In this regard, although no steps are taken to block the pulsating component of voltage appearing across resistor R5 due to receipt of pulses of infra-red radiation by sensor 43, it has been found that, in practice, the non pulsating component of voltage across resistor R5 (which component is directly proportional to the ambient light level sensed by sensor 43) is more effective for signal levels required to operate detector 49 than the short duration pulsating voltage components, so that the detector 49 can operate on the signal voltage across resistor R5 as if there were no pulsating component of such voltage. The operation of detector 49 is as follows, bearing in mind that the amplified voltage from amplifier 114 rises under the condition where there is low ambient light detected by sensor 43, and this voltage rise is delayed by the network comprising capacitor C14 and resistor R31:

The condition when there is high ambient light, the voltage applied to the non-inverting terminal of amplifier 114 is such that the amplifier 114 is saturated and capacitor C14 charges through resistor R31 to maintain amplifier 116 turned off. In the event that light level should suddenly fall, the voltage applied to the non-inverting input of amplifier 114 is such as to cause the output of amplifier 114 to fall to ground and capacitor C14 immediately discharges via diode D11 to cause variation in the voltage applied to the inverting terminal of amplifier 116 and to cause turning on of this amplifier and also turning on of switch 67. Thus, turn-on of switch 67 occurs virtually immediately on detection of decrease in ambient light levels. On the other hand, after such turning on of amplifier 116, switching off of this can only occur after a predetermined delay from a change in output of amplifier 114. Thus, if high light level is again detected by sensor 43, this will substantially immediately cause output of amplifier 114 to be raised so that capacitor C14 will begin to charge through resistor R31. However, since some 3 seconds is required to cause charging of the capacitor C14 it will take some 3 seconds for switching of amplifier 116 to occur so that under these conditions, the output of amplifier 116 will remain on for some 3 seconds after detection by sensor 43 of a condition in which there is a high ambient light level and consequent switching of switch 67 will not occur until after such time period. Also, the network R32, R33 and R34 is so arranged such that it requires, under the condition of ambient light increase, twice as high a light level as sensed by sensor 43 before switching off of the output from amplifier 116 will occur as compared to the light level which is required, under the condition of falling ambient light level in order to effect turning on of amplifier 116.

SWITCH 67

Switch 67 comprises a transistor Q8 having its base connected to the output of amplifier 116 via a resistor R39. The emitter of transistor Q8 is connected to ground, and the collector is connected to positive supply via a light emitting diode 118 and series resistor R43. Under the condition where amplifier 116 is turned on, transistor Q8 is also turned on to cause grounding of the collector thereof which collector is connected to one end of the coil of relay RL3, the other end of the relay coil being connected to positive supply. This energization of relay RL3 which occurs pursuant to such switching on of transistor Q8 causes closing of contacts RL3/1 so that the lights of the vehicle 16 are turned on by virtue of being connected across positive supply. By virtue of the aforedescribed arrangement, then, the vehicle lights will be switched on under the condition where ambient light falls to a first predetermined level and will be switched off when the ambient light again rises to a second predetermined level, with the switching off occurring only after a 3 second delay following the rise in the ambient light above the second predetermined level.

The various components of the circuit of FIG. 4 may be as follows:

Amplifiers 90, 92, 96, 114: N.S. LM324 N Quad operational amplifier.

Amplifiers 100, 104, 108, 116: N.S. LM324 N Quad operational amplifier $R_1$ - 10 Ω ½w                    $R_{23}$ - 10K ½w -continued

| | |
|---|---|
| $R_2$ - 470 Ω ¼w | $R_{24}$ - 5.6K ¼w |
| $R_3$ - 47 Ω ¼w | $R_{25}$ - 100K ¼w |
| $R_4$ - A.O.T. Nom. 1 Ω ½w | $R_{26}$ - 150K ¼w |
| $R_5$ - 2.7K ¼w | $R_{27}$ - 1M ¼w |
| $R_6$ - A.O.T. Nom. 100 Ω ¼w | $R_{28}$ - 75K ¼w |
| $R_7$ - 10K ¼w | $R_{29}$ - 1M ¼w |
| $R_8$ - 68K ¼w | $R_{30}$ - 1M ¼w |
| $R_9$ - 1M ¼w | $R_{31}$ - 4.7M ¼w |
| $R_{10}$ - 68K ¼w | $R_{32}$ - 180K ¼w |
| $R_{11}$ - 1M ¼w | $R_{33}$ - 2.7K ¼w |
| $R_{12}$ - 68K ¼w | $R_{34}$ - 100K ¼w |
| $R_{13}$ - 1M ¼w | $R_{35}$ - 1K ¼w |
| $R_{14}$ - 1M ¼w | $R_{36}$ - 1K ¼w |
| $R_{15}$ - 1K ¼w | $R_{37}$ - 1K ¼w |
| $R_{16}$ - 1M ¼w | $R_{38}$ - 1K ¼w |
| $R_{17}$ - 100K ¼w | $R_{39}$ - 1K ¼w |
| $R_{18}$ - 100K ¼w | $R_{40}$ - 1K ¼w |
| $R_{19}$ - 100K ¼w | $R_{41}$ - 1K ¼w |
| $R_{20}$ - 1K ¼w | $R_{42}$ - 1K ¼w |
| $R_{21}$ - 10K ¼w | $R_{43}$ - 1K ¼w |
| $R_{22}$ - 1K ¼w | |
| VR1 - 1K Potentiometer | |
| $D_z$ - 10 V Zener ½w | |
| $C_1$ - 330 μf 15V Electrolytic | |
| $C_2$ - 15 μf tantalum bead 15V | |
| $C_3$ - 330 μf 15V Electrolytic. | |
| $C_4$ - 0.1 μf Disc Ceramic | |
| $C_5$ - 15 μf Tantalum bead 15V | |
| $C_6$ - 100 pf N750 Disc Ceramic 25V | |
| $C_7$ - 100 pf N750 Disc Ceramic 25V | |
| $C_8$ - 0.0047 μf Polyester 25V | |
| $C_9$ - 10 μf Tantalum Bead 15V | |
| $C_{10}$ - 10 μf Tantalum Bead 15V | |
| $C_{11}$ - 10 μf Tantalum Bead 15V | |
| $C_{12}$ - 10 μf Tantalum Bead 15V | |
| $C_{13}$ - 1 μf Tantalum Bead 15V | |
| $D_1 D_2 + D_3$ - Siemens LD271 I-R Emitter | |
| sensors 43,45-Siemens BP104 I-R Sensor. | |
| $D_5$ - IN914 Silicon Diode | |
| $D_8$ - IN914 Silicon Diode | |
| $D_9$ - IN914 Silicon Diode | |
| $D_{10}$ - IN914 Silicon Diode | |
| $D_{11}$ - OA91 Germanium Diode | |
| $D_{12}$ - IN914 Silicon Diode | |
| $D_{13}$ - IN914 Silicon Diode | |
| $D_{14}$ - IN914 Silicon Diode | |
| $D_{15}$ - IN914 Silicon Diode | |
| $D_{16}$ - BY127 Silicon Diode | |
| $Q_1$ - BC 547 NPN | |
| $Q_2$ - 2N 5191 NPN | |
| $Q_3$ - BC 547 NPN | |
| $Q_4$ - BD 235 NPN | |
| $Q_5$ - BD 235 NPN | |
| $Q_6$ - BC 547 NPN | |
| $Q_7$ - BD 235 NPN | |
| $Q_8$ - BD 235 NPN | |

The described arrangement has been advanced merely by way of explanation. In particular, whilst the use of infra-red sensors and emitter devices has been described, it is possible to use other means for sensing the presence of water or dust on a vehicle windscreen. In particular, "ultra sound" generators and detectors can be employed for this purpose. Except in such an arrangement switching on of the headlamps cannot be effected as described nor is it then possible to distinguish between dust or water. However, such an arrangement can detect water and operate the wipers only.

I claim:

1. A control apparatus for a vehicle having a windscreen, windscreen wiper apparatus and windscreen washer apparatus; said control apparatus comprising:
   (a) emitter means having an emitter device for generating energy and directing the generated energy away therefrom;
   (b) first sensor means having a control sensor device for sensing energy directed thereto from said emitter means;
   (c) first switch means for coupling to said windscreen wiper apparatus for effecting operation of said windscreen wiper apparatus pursuant to a change of stage of said first switch means;
   (d) second switch means for coupling to windscreen washer apparatus for effecting operation of said windscreen washer apparatus pursuant to a change of state of said second switch means;
   (e) support means supporting said emitter device and control sensor device for mounting these against the interior surface of said windscreen so that when energy is directed away from said emitter device portion of said energy may be reflected back to said control sensor device; said sensor means being responsive to the magnitude of said portion of said energy reflected back to said control sensor device to cause a first alteration of electrical condition of the sensor means when there is water on an outer surface of said windscreen opposite said interior surface and to cause a second alteration of said electrical condition when there is dust on said outer surface; and
   (f) switch control means coupled to said sensor means and to said first and second switch means and being responsive to effect said change of state of said first switch means pursuant to occurrence of said first alteration of electrical condition of said sensor means for effecting said operation of said windscreen wiper apparatus, and said switch control means being responsive to effect said changes of state of both said first switch means and said second switch means pursuant to occurrence of said second alteration of said electrical condition of said sensor means, for effecting said operation of both said windscreen wiper apparatus and said windscreen washer apparatus.

2. Control apparatus as claimed in claim 1, wherein said emitter device comprises an infra-red radiation emitting device operable to emit infra-red radiation on application of electric potential thereto, and said sensor means is sensitive to incident infra-red radiation thereon to effect said alterations of electrical condition.

3. Control apparatus as claimed in claim 2, including pulse generating means connected to said infra-red radiation emitting device for repetitively applying said electric potential to said infra-red radiation emitting device for causing corresponding generation of time spaced pulses of infra-red radiation from said infra-red radiation emitting device, said sensor means being operable to generate time spaced first signal pulses corresponding to incidence of reflected said time spaced pulses of said infra-red radiation on said emitter device, said first signal pulses being of amplitude related to the strength of said reflected pulses of infra-red radiation.

4. Control apparatus as claimed in claim 3, said switch control means being responsive to effect said change of the state of said first switch means when said first signal pulses are of a first amplitude.

5. Control apparatus as claimed in claim 4, said switch control means being responsive to effect said changes of state of said first and second switch means when said first signal pulses are of a particular amplitude different to said first amplitude.

6. Control apparatus as claimed in claim 5, including a reference signal generator having a reference sensor device sensitive to infra-red radiation and said reference sensor device being carried by said support means for receiving said infra-red radiation pulses directly from said infra-red radiation emitting device, said reference signal generator being operable to generate second signal pulses pursuant to variation in electrical condition of said reference sensor device occurring by virtue of incidence of said infra-red radiation pulses from said infra-red radiation emitting device on said reference sensor device; first filter means being porvided coupled to said reference signal generator for generating a reference signal by filtering said second signal pulses generated by said reference signal generator, to produce said reference signal as a DC signal; said control apparatus further including second filter means coupled to said sensor means for receiving said first signal pluses and generating therefrom a DC voltage of amplitude proportional to the amplitude of the first signal pulses; said switch control means including first comparator means coupled to said first filter means for receiving said reference signal and to said second filter means for receiving said DC voltage, for operating said first switch means to effect said change of state thereof when said DC voltage and said reference signal exhibit a first predetermined relationship therebetween; said switch control means including second comparator means coupled to said first filter means for receiving said reference signal and to said second filter means for receiving said DC voltage, for operating said second switch means to effect said change of state of said second switch means when said DC voltage and said reference signal exhibit a second predetermined relationship different to said first predetermined relationship, whereby said first amplitude and said particular amplitude are relative to the DC signal which comprises said reference signal.

7. Control apparatus as calimed in claim 6, including coupling means coupling said second comparator means to said first switch means for changing the state of said first switch means when the state of said second switch means is changed under control of said second comparator means.

8. A control apparatus as set forth in claim 1, wherein said windscreen wiper apparatus is selectively operable at either of two speeds, said control apparatus includes further switch means for effecting, in conjunction with said first switch means, control of said wiper apparatus for operation of the wiper apparatus at either of said two speeds in accordance with the states of said first switch means and further switch means; said switch control means including third comparator means coupled to said first filter means for receiving said reference signal and to said second filter means for receiving said DC voltage, for controlling said further switch means to effect a change of the state thereof when said reference signal and DC voltage exhibit a third predetermined relationship different to said first and second predetermined relationships and representative of the presence of a quantity of water on said windscreen different to the quantity of water on the windscreen for which said first predetermined relationship is representative.

9. A control apparatus as set forth in claim 6, wherein said windscreen wiper apparatus is selectively operable at either of two speeds and said control apparatus includes further switch means for effecting, in conjunction with said first switch means, control of said wiper apparatus for operation of the wiper apparatus at either of said two speeds in accordance with the states of said first switch means and further switch means; said switch control means including third comparator means coupled to said first filter means for receiving said reference signal and to said second filter means for receiving said DC voltage, for controlling said further switch means to effect a change of the state thereof when said reference signal and DC voltage exhibit a third predetermined relationship different to said first and second predetermined relationships and representative of the presence of a quantity of water on said windscreen different to the quantity of water on the windscreen for which said first predetermined relationship is representative.

10. Control apparatus as claimed in claim 2, wherein said support means supports said emitter device for directing said infra-red radiation at an angle in the range 20°–40° to a normal to the interior windscreen surface.

11. Control apparatus as claimed in claim 7, wherein said support means supports said emitter device for directing said infra-red radiation at an angle in the range 20°–40° to a normal to the interior windscreen surface.

12. A control apparatus for a vehicle having a windscreen, windscreen wiper apparatus, windscreen washer apparatus and vehicle lights; said control apparatus comprising:
  (a) emitter means having an emitter device for generating energy and directing the generated energy away therefrom;
  (b) sensor means having a sensor device for sensing energy directed thereto from said emitter means;
  (c) first switch means for coupling to said windscreen wiper apparatus for effecting operation of said windscreen wiper apparatus pursuant to a change of state of said first switch means;
  (d) second switch means for coupling to said windscreen washer apparatus, for effecting operation of said windscreen washer apparatus pursuant to a change of state of said second switch means;
  (e) a third switch means for connection to said vehicle for controlling operation of said vehicle lights;
  (f) support means supporting said emitter device and control sensor device for mounting these against the interior surface of said windscreen so that when energy is directed away from said emitter device portion of said energy may be reflected back to said control sensor device; said sensor means being responsive to the magnitude of said portion of said energy reflected back to said control sensor device to cause a first alteration of electrical condition of the sensor means when there is water on an outer surface of said windscreen opposite said interior surface and to cause a second alteration of said electrical condition when there is dust on said outer surface;
  (g) switch control means coupled to said sensor means and to said first and second switch means and being responsive to effect said change of state of said first switch means pursuant to occurrence of said first alteration of electrical condition of said sensor means for effecting said operation of said windscreen wiper apparatus, and said switch control means being responsive to effect said changes of state of both said first switch means and said second switch means pursuant to occurrence of said second alteration of said electrical condition of said sensor means, for effecting said operation of both said windscreen wiper apparatus and said windscreen washer apparatus;

(h) detector means coupled to said sensor means for generating a light level signal representative of the level of ambient light on said control sensor device; said third switch means being coupled to said detector means via controlling means responsive to said light level signal to switch said third switch means from one state to another state pursuant to a change in said light level signal indicative of a first predetermined relatively low said level of ambient light on said control sensor device, for then turning on said vehicle lights.

13. Control apparatus as claimed in claim 12, wherein said emitter device comprises an infra-red radiation emitting device operable to emit infra-red radiation on application of electric potential thereto, and said sensor means is sensitive to incident infra-red radiation thereon to effect said alterations of electrical condition.

14. Control apparatus as claimed in claim 13, including pulse generating means connected to said infra-red radiation emitting device for repetitively applying said electric potential to said infra-red radiation emitting device for causing corresponding generation of time spaced pulses of infra-red radiation from said infra-red radiation emitting device, said sensor means being operable to generate time spaced first signal pulses corresponding to incidence of reflected said pulses of said infra-red radiation on said emitter device, said first signal pulses being of amplitude related to the strength of said reflected pulses of infra-red radiation.

15. Control apparatus as claimed in claim 14, said switch control means being responsive to effect said change of the state of said first switch means when said first signal pulses are of a first amplitude.

16. Control apparatus as claimed in claim 15, said switch control means being responsive to effect said changes of state of said first and second switch means when said first signal pulses are of a particular amplitude different to said first amplitude.

17. Control apparatus as claimed in claim 16, including a reference signal generator having a reference sensor device sensitive to infra-red radiation and, said reference sensor device being carried by said support means for receiving said infra-red radiation pulses directly from said infra-red radiation emitting device, said reference signal generator being operable to generate second signal pulses pursuant to variation in electrical condition of said reference sensor device occurring by virtue of incidence of said infra-red radiation pulses from said infra-red radiation emitting devices on said reference sensor device; first filter means being provided coupled to said reference signal generator for generating a reference signal by filtering said second signal pulses generated by said reference signal generator, to produce said reference signal as a DC signal; said control apparatus further including second filter means coupled to said sensor means for receiving said first signal pulses and generating therefrom a DC voltage of amplitude proportional to the amplitude of the first signal pulses; said switch control means including first comparator means coupled to said first filter means for receiving said reference signal and to said second filter means for receiving said DC voltage, for operating said first switch means to effect said change of state thereof when said DC voltage and said reference signal exhibit a first predetermined relationship therebetween; said switch control means including second comparator means coupled to said first filter means for receiving said reference signal and to said second filter means for receiving said DC voltage signal, for operating said second switch means to effect said change of state of said second switch means when said DC voltage and said reference signal exhibit a second predetermined relationship different to said first predetermined relationship, whereby said first amplitude and said particular amplitude are relative to the DC signal which comprises said reference signal.

18. Control apparatus as claimed in claim 17, including coupling means coupling said second comparator means to said first switch means for changing the state of said first switch means when the state of said second switch means is changed under control of said second comparator means.

19. Control apparatus as claimed in claim 12, wherein said support means supports said emitter device for directing said infra-red radiation at an angle in the range 20°–40° to a normal to the interior windscreen surface.

20. A vehicle having
(a) a windscreen;
(b) windscreen wiper apparatus;
(c) windscreen washer apparatus; and
(d) control apparatus for controlling the windscreen wiper apparatus and windscreen washer apparatus, said control apparatus comprising:
(i) emitter means having an emitter device for generating energy and directing the generated energy away therefrom;
(ii) first sensor means having a control sensor device for sensing energy directed thereto from said emitter means;
(iii) first switch means coupled to said windscreen wiper apparatus for effecting operation of said windscreen wiper apparatus pursuant to a change of state of said first switch means;
iv) second switch means coupled to windscreen washer apparatus for effecting operation of said windscreen washer apparatus pursuant to a change of state of said second switch means;
(v) support means supporting said emitter device and control sensor device and mounting these against the interior surface of said windscreen so that when energy is directed away from said emitter device portion of said energy may be reflected back to said control sensor device; said sensor means being responsive to the magnitude of said portion of said energy reflected back to said control sensor device to cause a first alteration of electrical condition of the sensor means when there is water on an outer surface of said windscreen opposite said interior surface and to cause a second alteration of said electrical condition when there is dust on said outer surface; and
(vi) switch control means coupled to said sensor means and to said first and second switch means and being responsive to effect said change of state of said first switch means pursuant to occurrence of said first alteration of electrical condition of said sensor means, for effecting said operation of said windscreen wiper apparatus, and said switch control means being responsive to effect said changes of state of both said first switch means and said second switch means pursuant to occurrence of said second alteration of said electrical condition of said sensor means, for effecting said operation of both said windscreen wiper apparatus and said windscreen washer apparatus.

21. A vehicle as claimed in claim 20, wherein said emitter device comprises an infra-red radiation emitting device operable to emit infra-red radiation on application of electric potential thereto, and said sensor means is sensitive to incident infra-red radiation thereon to effect said alterations of electrical condition; said control apparatus including pulse generating means connected to said infra-red radiation emitting device for repetitively applying said electric potential to said infra-red radiation emitting device for causing corresponding generation of time spaced pulses of infra-red radiation from said infra-red radiation emitting device, said sensor means being operable to generate time spaced first signal pulses corresponding to incidence of reflected said pulses of said infra-red radiation on said emitter device, said first signal pulses being of amplitude related to the strength of said reflected pulses of infra-red radiation; said switch control means being responsive to effect said changes of state of said first and second switch means when said first signal pulses are of a particular amplitude different to said first amplitude; said control apparatus further including a reference signal generator having a reference sensor device sensitive to infra-red radiation and said reference sensor device being carried by said support means for receiving said infra-red radiation pulses directly from said infra-red radiation emitting device, said reference signal generator being operable to generate second signal pulses pursuant to variation in electrical condition of said reference sensor device occurring by virtue of incidence of said infra-red radiation pulses from said infra-red radiation emitting device on said reference sensor device; first filter means being provided coupled to said reference signal generator for generating a reference signal by filtering said second signal pulses generated by said reference signal generator, to produce said reference signal as a DC signal; said control apparatus further including second filter means coupled to said sensor means for receiving said first signal pulses generating therefrom a DC voltage of amplitude proportional to the amplitude of the first signal pulses; said switch control means including first comparator means coupled to said first filter means for receiving said reference signal and to said second filter means for receiving said DC voltage, for operating said first switch means to effect said change of state thereof when said DC voltage and said reference signal exhibit a first predetermined relationship therebetween; said switch control means including second comparator means coupled to said first filter means for receiving said reference signal and to said second filter means for receiving said DC voltage, for operating said second switch means to effect said change of state of said second switch means when said DC voltage and said reference signal exhibit a second predetermined relationship different to said first predetermined relationship, whereby said first amplitude and said particular amplitude are relative to the DC signal which comprises said reference signal.

22. A vehicle as claimed in claim 20, wherein said support means supports said emitter device for directing said infra-red radiation at an angle in the range 20°–40° to a normal to the interior windscreen surface.

23. A method of controlling vehicle windscreen wiper apparatus and vehicle windscreen washer apparatus comprising detecting the presence of dust or water on a vehicle windscreen by directing energy through the interior surface of the windscreen to be reflected at the outer surface of the windscreen and to pass back through the windscreen and through the interior surface of the windscreen to the interior of the vehicle, detecting variations in intensity of such reflected energy due to presence of water or dust on the windscreen, and, in response to detection of such variations, operating the windscreen wiper apparatus alone when there is water on the windscreen, and operating both the windscreen wiper apparatus and the windscreen washer apparatus when there is dust on the windscreen.

24. A method as claimed in claim 23, including additionally detecting, with the same detector which detects said variations in intensity of reflected energy, variations in ambient energy on said windscreen and operating the vehicle lights in dependence upon variations in said ambient energy.

25. A method as claimed in claim 23, or claim 24, wherein said directed energy is infra-red radiation.

26. A method as claimed in claim 25, wherein said directed infra-red radiation is directed through said interior surface into the windscreen at an angle of 20°–40° to a normal to the interior windscreen surface.

27. A vehicle having
(a) a windscreen;
(b) a windscreen wiper apparatus;
(c) windscreen washer apparatus;
(d) vehicle lights; and
(e) control apparatus for controlling the windscreen wiper apparatus, windscreen washer apparatus and vehicle lights, said control apparatus comprising:
(i) emitter means having an emitter device for generating energy and directing the generated energy away therefrom;
(ii) first sensor means having a control sensor device for sensing energy directed thereto from said emitter means;
(iii) first switch means coupled to said windscreen wiper apparatus for effecting operation of said windscreen wiper apparatus pursuant to a change of state of said first switch means;
(iv) second switch means coupled to windscreen washer apparatus for effecting operation of said windscreen washer apparatus pursuant to a change of state of said second switch means;
(v) third switch means coupled to said vehicle lights for controlling said vehicle lights;
(vi) support means supporting said emitter device and control sensor device and mounting these against the interior surface of said windscreen so that when energy is directed away from said emitter device portion of said energy may be reflected back to said control sensor device; said sensor means being responsive to the magnitude of said portion of said energy reflected back to said control sensor device to cause a first alteration of electrical condition of the sensor means when there is water on an outer surface of said windscreen opposite said interior surface and to cause a second alteration of said electrical condition when there is dust on said outer surface;
(vii) switch control means coupled to said sensor means and to said first and second switch means and being responsive to effect said change of state of said first switch means pursuant to occurrence of said first alteration of electrical condition of said sensor means, for effecting said operation of said windscreen wiper apparatus, and said switch control means being responsive to effect said changes of state of both said first switch means and said second switch means pursuant to occurrence of said second alteration of said electrical condition of said sensor means, for effecting said operation of both said windscreen wiper apparatus and said windscreen washer apparatus;

(viii) detector means coupled to said sensor means for generating a light level signal representative of the level of ambient light on said control sensor device, said third switch means being coupled to said detector means via controlling means responsive to said light level signal to switch said third switch means from one state to another state pursuant to a change in said light level signal indicative of a first predetermined relatively low said level of ambient light on said control sensor device, for then turning on said vehicle lights.

28. A vehicle as claimed in claim 27, wherein said support means supports said emitter device for directing said infra-red radiation at an angle in the range 20°–40° to a normal to the interior windscreen surface.

* * * * *